Nov. 29, 1966  R. A. HITCH  3,288,537
MEANS FOR HANDLING MATERIAL
Filed July 26, 1965  2 Sheets-Sheet 1
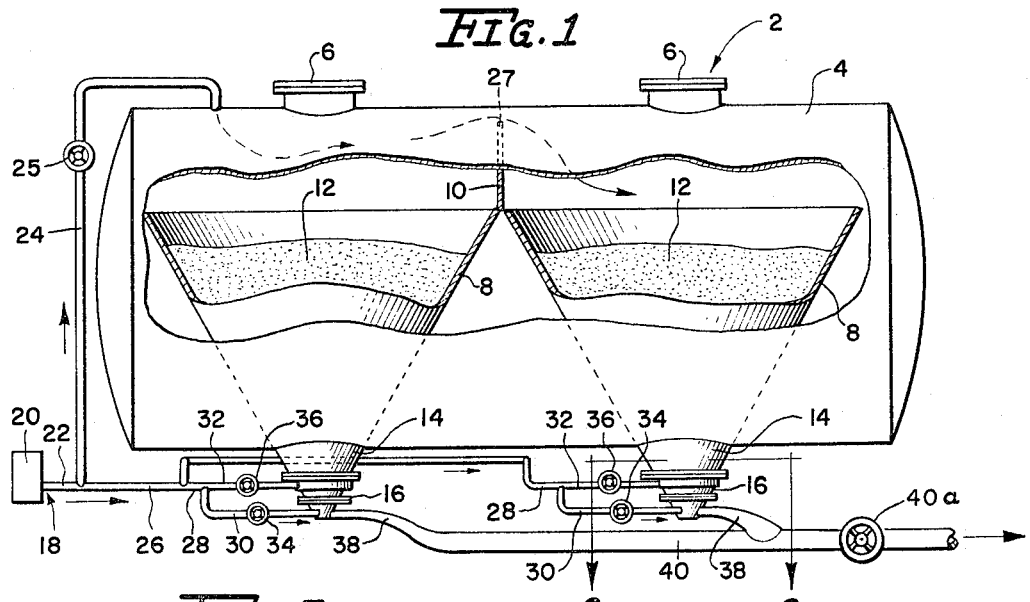
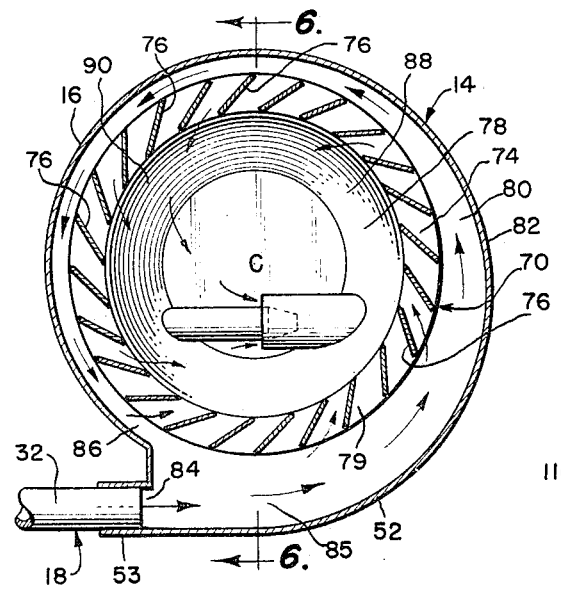
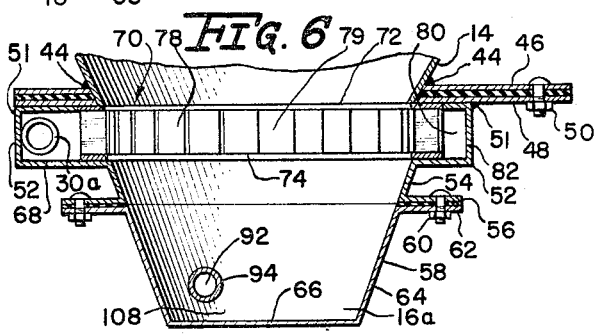
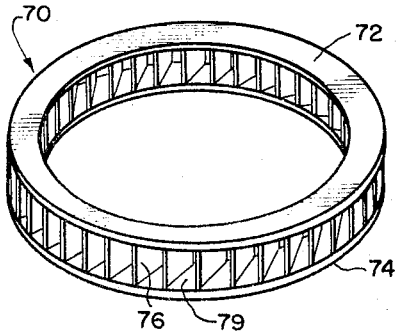
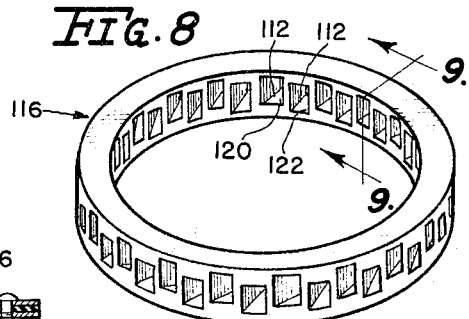
INVENTOR.
Robert A. Hitch
BY
Richard J. Myers
Attorney Nov. 29, 1966  R. A. HITCH  3,288,537
MEANS FOR HANDLING MATERIAL
Filed July 26, 1965  2 Sheets-Sheet 2
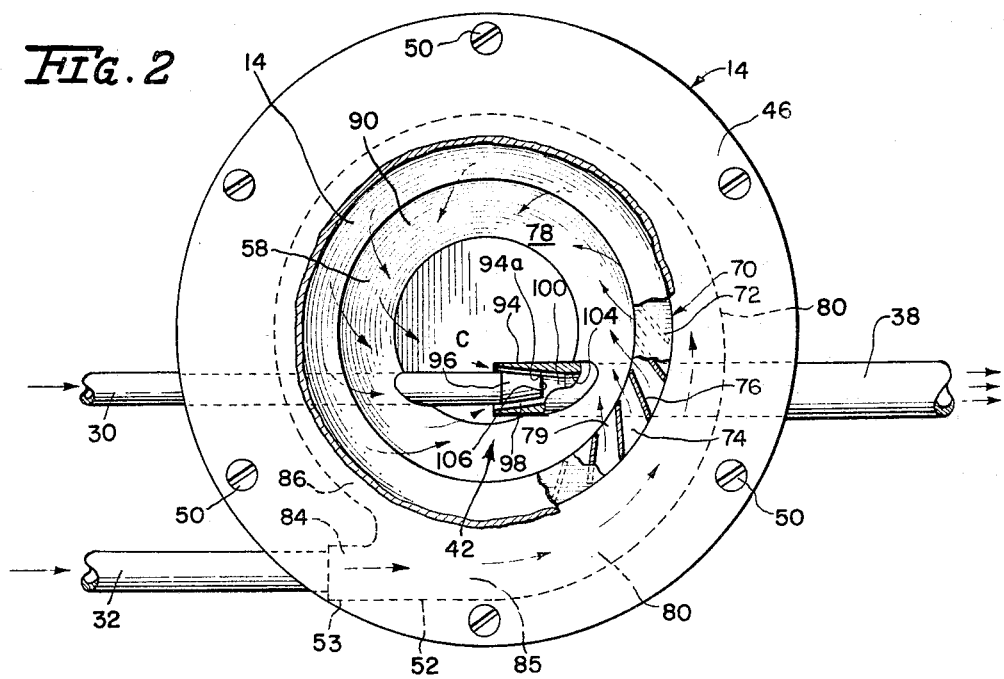
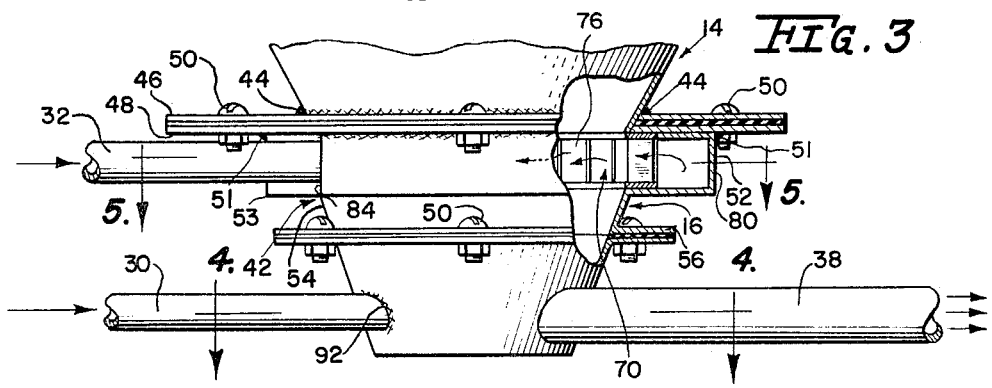
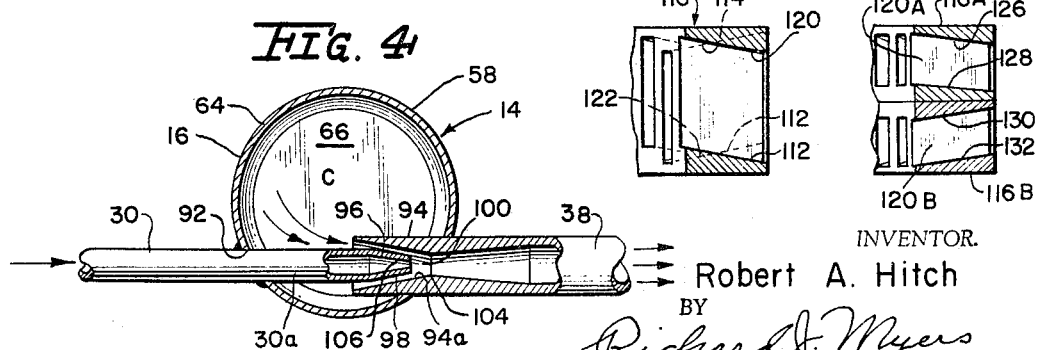
INVENTOR.
Robert A. Hitch
BY
Richard J. Myers
Attorney United States Patent Office
3,288,537
Patented Nov. 29, 1966

3,288,537
MEANS FOR HANDLING MATERIAL
Robert A. Hitch, Milford, N.J., assignor to Pullman Incorporated, Chicago, Ill., a corporation of Delaware
Filed July 26, 1965, Ser. No. 474,880
11 Claims. (Cl. 302—53)

This invention is related to means for handling material and in particular to means that will break up or unclog pulverulent or granular material or the like stored within a hopper portion of a material storage vessel.

It has been found in practice that material of the pulverulent or granular nature that is stored in a storage vessel tends to clog or lump in a flow restricting manner in the lower portion of the hopper and therefore the contents of the hopper cannot be emptied even with the introduction of pneumatic pressure into the hopper area.

It is therefore a general object of this invention to provide a new and improved means of handling material and in particular handling material and aiding the discharge of same from a hopper of a storage vessel or the like.

It is a further object of this invention to provide pneumatic means for breaking up the conglomerated or packed particles of material in the lower portion of a hopper by pneumatic means to enable discharge of the entire contents from the storage vessel.

Still a further object of this invention is to provide novel structure in the form of a means for introduction of pneumatic pressure such as air pressure into the peripheral or side portion of the lower hopper area in a swirling manner to develop a vortical flow of the material in the lower hopper portion breaking up the congestion of such material to enable it and the material above it to flow out of the hopper portion.

Still another object of this invention is to provide a novel discharge means for the lower portion of a hopper containing pulverulent or granular material or the like whereby such means introduces a whirlpool current as a result of tangentially introduced pneumatic pressure about the periphery of the hopper portion and further introduction of pneumatic pressure in the lower portion of the hopper below the whirlpool effect in the form of a venturi means to act in combination with the whirlpool means in that the venturi means initially breaks up the congested material in the lower portion of the hopper.

Another object of this invention is to provide a hopper as aforesaid which permits discharge of other fluids, such as liquids, as well as pulverulent solids.

These and other objects will become apparent from a reference to the following description and claims, and attached drawings wherein:

FIG. 1 is an elevational view of a material handling device;

FIG. 2 is a sectional view of said device taken along line 2—2 of FIG. 1;

FIG. 3 is a view partly in section of the lower portion of the hopper means of the material handling means;

FIG. 4 is a sectional view taken along line 4—4 of FIG. 3;

FIG. 5 is a sectional view taken along line 5—5 of FIG. 3;

FIG. 6 is a view taken along line 6—6 of FIG. 5;

FIG. 7 is a view of the member enabling the creation of the whirlpool effect within the lower portion of the hopper;

FIG. 8 is a modified form of the whirlpool creating member shown in FIG. 7;

FIG. 9 is a sectional view taken along line 9—9 of FIG. 8; and

FIG. 10 is a modified form of that shown by FIG. 9 whereby the air currents are directed upwardly and downwardly by separate whirlpool means.

With reference now to the drawings and in particular to FIG. 1 there is shown a storage vessel or cylindrical tank 2 for carrying bulk material such as pulverulents or granular solid-like material. The storage vessel 2 has a cylindrical member container 4 provided with a plurality of material inlets 6 in the top portion thereof. The interior of the tank 4 is provided with a plurality of hoppers 8 separated from one another by a dividing wall 10 and communicative with their respective inlet openings 6, and containing material in the powder or granular form or the like 12. The lower part 14 of the cone-shaped hopper 8 continues to taper to a general apex portion 16. It is seen that the apex portion 16 of the lower hopper portion 14 is in communication with conduit means 18 containing a source of fluid under pressure from a compressor 20 such as an air compressor. The fluid or air leaving the compressor 20 is directed through conduit 22 of the conduit means and then through line 24 with air close off valve 25 into the upper portion of the tank 4 to provide a pressure head on the material 12 within each of the hoppers 8, the air pressure being allowed to go into each of the hoppers by way of small opening 27 (see arrows) defined between the wall 10 and the upper cylindrical wall of the tank 4. Air pressure is also directed from conduit 22 into line 26 which branches into a plurality of conduits 28 that are directed to each of the lower or apex portion 16 of the hopper 8. Each conduit 28 divides into conduits 30 and 32 which introduce pneumatic fluid under pressure to lower and upper portions of the apex portion 16 of the hopper 8, the valves 34 and 36 respectively controlling the introduction of fluid pressure through these lines where the fluid pressure may be completely cut off from the apex zone or only partial flow may occur, or full flow of the fluid may occur. Exiting from the bottom portion 16a of the apex or discharge portion 16 is a conduit 38 from each of the hoppers which joins a main discharge line 40 for directing the material being discharged from the hopper to a material storage container (not shown), said line 40 having on and off valve 40a which has graduated flow restricting positions.

As seen now particularly in FIGURES 2 through 6 the lower or apex portion 16 of the lower portion 14 of the conical shaped hopper 8 is provided with a downwardly tapering cylindrical portion 42 that is attached to the lower hopper portion 14 as by welds 44 securing the horizontal flange 46 of portion 42 thereto which is fastened to its lower flange 48 by bolt means 50 to which is attached by weldments 51 of the vortex or whirlpool portion (being U-shaped in cross section—see FIG. 6) 52 which is in the form of a circulating spiral housing with inlet tip 53 and having a lower conically shaped reduced portion 54 formed integrally with a horizontal angular flange part 56 which is secured to the lower tapered cylindrical bottom portion 58 by bolt means 60 passing through the flange 62 thereof and which is integral with the sloping walls 64 and bottom wall 66. The U-shaped projections or extensions 68 of the vortex portion 52 provide surfaces 70 for carrying an annular turbine blade member or circular whirlpool or vortex element 70 as shown in FIG. 7. The whirlpool creating element 70 is provided with a top annular or circular ring or wall 72 and a bottom annular or circular ring or wall 74, the two annular rings 72, 74 sandwiching between them a plurality of peripherally stationed upright vanes or walls 76 to define with the annular rings a plurality of air passages 79 or openings that communicate with the interior 78 of the apex portion of the hopper with the passageway 80 defined by the outer wall 82 of the tornado-effecting or whirlpool or vortex creating part 52 and the whirlpool element 70.

As best seen in FIGS. 2, 5 and 6 the passage 80 joins with the inlet conduit 32 the beginning portion 84 (defined by part 53) of the passage 80 being enlarged at passage part 85 and then decreasing in a spiral annular path about the whirlpool element 70 to where it has a relatively reduced portion 86 adjacent to the portion 84. Also the vertical webs or vanes 76, as viewed in FIG. 5 are orientated transversely to radial lines eminating outwardly from the center of the vortex ring 70 to provide for tangential flow of the air into the interior whirlpool passage 88 defined by the interior of the vortex unit 70. As the air progresses from the enlarged area 84 to the reduced area 86 of the passage 80 it will be seen that less air is allowed to be introduced into a particular passage 79 defined by a pair of vanes, 76, 76 and the upper and lower annular sections 72 and 74. This provides for a constant velocity of air or fluid to be introduced from each zone 79 into the interior area 88 in a tangential swirling manner. The effect of this is to develop a whirlpool or cyclone effect within the area 88 creating a theoretically infinite velocity at the central or core portion C of the chamber 88 and approaching zero pressure or low pressure at the core or eye C of the area 88 with an increasingly greater pressure and decreasing velocity out toward the inner peripheral portions 90 of the chamber 88. This whirlpool effect causes swirling of the packed material and causes it to be broken up and sent into a centrifugal swirling whirlpool or cyclone path for discharge from the lower or apex portion of the hopper.

The lower bottom well 58 is provided with an opening 92 for receiving the conduit portion 30a of conduit 30 and has therein a discharge tube portion 94 of conduit 38 having outward divergent tube inner wall portion 94a extending over the tapered end 96 of the conduit 30a to define therewith a reduced annular passage 98 which communicates with the enlarged area 100 defined by the tappered inner wall 94a of the discharge tube portion 94 which forms the end of the discharge conduit 38 within the lower conical or apex section of the hopper. The area 100 tapers to constriction 104 and then diverges out in conduit 38. The inner association between the tapered end 96 and the tapered end 94 adjacent constricted part 104 causes the air under pressure to be introduced through the small nozzle opening 106 of the nozzle or end 96 into the tapered inlet 94 through constriction 104 at a high velocity sucking in air and material in the very lower portion of the well zone 58 of the hopper. It is this sucking of the material into the interior end of the discharge conduit 38 that breaks up the material in the lower portion of the well by the venturi effect or action produced by the air flowing through the nozzle into the constriction 104 of discharge inner end 96 and results in a priming action causing material in the upper part of the well 16 and above the well to fall into the well area 16a, to this being added the whirlpool effect above the well which then can easily allow the material to be swirled into the well zone which material in the well zone 16a has been initially broken up by the venturi action of parts 94 and 96.

FIGURES 8 and 9 illustrate a modified form of whirlpool or vortex element 110 where the tangentially slanted floor 112 and roof 114 of single ring member 116 remain parallel to one another but in one inlet passage 120 are directed or slanted inwardly and upwardly and in the adjoining passage 122 are directed inwardly downwardly due to the tapering of their upper and lower surfaces, causing the air or pneumatic substance to be directed in one area or passage 120 upwardly in tangential flow as in the case with ring 70 into the interior of the vortex zone 88 and in the adjacent passage 122 to be diverted downwardly and tangentially into the vortex zone 88. This results in a greater area of pulverant material being exposed to the effect of the whirlpool or vortex swirling action. Thus a greater amount of material is able to be broken up and forced into the lower well portion 16a.

FIG. 10 shows a further modification similar to that shown in FIGURES 8 and 9 but where two separate rings 116A and 116B are employed, one being fastenedly backed upon the other and presenting passages 120A and 122A that divert the air flowing into the vortex chamber in upward and downward directions, respectively, the upward passage 120A having upper and lower surfaces 126, 128 that slope upwardly for directing the air upwardly into the vortex area and the lower passage 122A of the lower ring having upper and lower surfaces 130, 132 sloping downward to direct the air downward into the vortex area.

Thus it will be seen that the air is admitted into the top of the tank to exert an overhead downward force while concurrently air is forced through the vortex unit and through the venturi zone of the well through simultaneously applying air pressure for breaking up and removing of the material from the hopper, the venturi action occuring in the well initiating the unclogging or breaking up of the pulverant material for flow out the discharge orifice with the subsequent and concurrent breaking up of material by the vortex action of the whirlpool unit, the entire bulk of material being subject to a downward feeding by the air pressure head above the material.

It will be appreciated that the vortex chamber of this invention allows for the discharge of other fluids, such as liquids, as well as the discharge of pulverulent solid material. This novel arrangement permits gravity or pressurized discharge of liquids and by virtue of the chamber geometry of the vortex chamber will permit a complete discharge of such liquids without having to remove the liquids for residual pockets found in conventionally constructed hoppers and not found in this inventive design. Further, there are no moving parts or aerating pads to become saturated with liquid.

Although the foregoing description is necessarily of a detailed character in order that the invention may be completely set forth, it is to be understood that the specific terminology is not intended to be restrictive or confining, and that various rearrangements of parts and modfications of structural detail may be resorted to without departing from the scope of the invention as herein claimed.

What is claimed is:

1. A material handling hopper construction comprising a conical storage structure having an apex portion and a discharge passage communicating with the apex portion, said apex portion being provided with an upper fluid circulating means, said circulating means having an annular ring means disposed within the apex portion and defining an annular peripheral passage of gradually decreasing cross section in the direction of fluid flow, and a central whirlpool chamber, said annular ring means being provided with a plurality of trans-radial passages communicating the annular passage with the interior of the central whirlpool chamber, a lower fluid circulating means including a venturi means disposed within said apex portion and below said annular ring means member and communicating with the wirlpool chamber and said discharge passage, said trans-radial passages being trans-radial of the annular ring means and the central whirlpool chamber and being generally tangential of the annular peripheral passage and the periphery of the central whirlpool chamber in the direction of fluid flow to produce a whirlpool effect on the material in the whirlpool chamber.

2. A material handling hopper construction comprising a conical storage structure having a lower portion and a discharge passage communicating with the lower portion, said lower portion being provided with an upper fluid circulating means, said circulating means having an annular ring means disposed within the lower portion and defining an annnular peripheral passage of gradually decreasing cross section, a central whirlpool chamber in the direction of fluid flow, said annular ring means being provided with a plurality of trans-radial passages communicating the annular passage with the interior of the central whirlpool chamber, a lower fluid circulating means including a venturi means disposed within said chamber and below said annular ring means and communicating with the interior of the whirlpool chamber and said discharge passage, said trans-radial passages being trans-radial of the annular ring means and the central whirlpool chamber and being generally tangential of the annular peripheral passage and the periphery of the central whirlpool chamber in the direction of fluid flow to produce a whirlpool effect on the material in the whirlpool chamber.

3. A material handling hopper construction comprising a conical storage structure having a lower portion and a discharge passage communicating with the lower portion, said lower portion being provided with an upper fluid circulating means, said circulating means having an annular ring means disposed within the lower portion and defining an annular peripheral passage, a central whirlpool chamber, and said annular ring means being provided with a plurality of trans-radial passages communicating the annular passage with the interior of the central whirlpool chamber, a lower fluid circulating means including a venturi means disposed within said whirlpool chamber and below said annular ring means and communicating with the interior of the whirlpool chamber and said discharge passage, said trans-radial passages being trans-radial of the annular ring means and the central whirlpool chamber and being generally tangential of the annular passage and the periphery of the central whirlpool chamber in the direction of fluid flow to produce a whirlpool effect on the material in the whirlpool chamber.

4. A material handling hopper construction comprising a storage structure having a lower portion and a discharge passage communicating with the lower portion of the hopper, said lower portion being provided with an upper fluid circulating means, said circulating means having annular means connecting with the lower portion said annular means defining with the lower portion an annular peripheral passage and a central whirlpool chamber, said annular means being provided with a plurality of trans-radial passages communicating with the interior of the central whirlpool chamber, a lower fluid circulating means including a venturi means disposed within said whirlpool chamber and below said annular means and communicating with the interior of the whirlpool chamber and said discharge passage, said trans-radial passages being trans-radial of the annular means and the central whirlpool chamber and being generally tangential of the annular passage and the periphery of the central whirlpool chamber in the direction of fluid flow to produce a whirlpool effect on the material in the whirlpool chamber.

5. A material handling hopper means for discharging bulk material comprising conduit means communicating with the interior of the hopper means and a source of pneumatic fluid communicating with said conduit means, said conduit means comprising a first conduit extending within an upper portion of said hopper means and a second conduit, whirlpool creating means disposed within the lower portion of the hopper means and communicating with the second conduit and comprising an annular member defining with the hopper means a peripheral passage with an inlet connecting the second conduit, said passage diminishing in cross sectional area away from the inlet and defining a central chamber, a trans-peripheral passage means in said annular member receiving the pneumatic fluid from the peripheral passage in communication with the second conduit and transmitting same into a vortex pattern within said central chamber, and said conduit means having a third conduit communicating with the hopper means below said annular member, venturi means within said lower portion below the annular member, and material discharge means communicating with the lower interior portion of the hopper means said central chamber and said venturi means.

6. A material handling hopper for discharging bulk material therefrom comprising conduit means communicating with the interior of the hopper and a source of pneumatic fluid communicating with said conduit means, said conduit means comprising a first conduit extending within the lower portion of said hopper, whirlpool creating means disposed within said lower portion of the hopper and communicating with the first conduit and comprising an annular member defining with the hopper a peripheral passage of diminishing cross sectional area in a path about the member and a central chamber, a trans-peripheral passage means in said annular member receiving the pneumatic fluid from the peripheral passage in communication with the first conduit and transmitting same into a vortex pattern within said central chamber, and said conduit means having a second conduit communicating with the lower interior portion of the hopper below said annular member, venturi means within said lower portion below the annular member, and material discharge means communicating with the lower interior portion of the hopper, said central chamber and said venturi means.

7. A material handling hopper for discharging bulk material therefrom comprising conduit means communicating with the interior of the hopper and a source of pneumatic fluid communicating with said conduit means, said conduit means comprising a first conduit extending within the lower portion of said hopper, whirlpool creating means disposed within said lower portion of the hopper and communicating with the first conduit of the conduit means and comprising an annular member defining with the hopper a peripheral passage and a central chamber, said first conduit being in tangential communication with said peripheral passage, a trans-peripheral and trans-radial passage means in said annular member receiving the pneumatic fluid from the peripheral passage in communication with the first conduit and transmitting same into a vortex pattern within said central chamber, and said conduit means having a second conduit communicating with the lower portion of the hopper below said annular member, venturi means within said lower portion below the annular member, and material discharge means communicating with the lower interior portion of the hopper, said central chamber and said venturi means.

8. A hopper construction exposed to a pneumatic medium under pressure comprising a conduit means carrying said penumatic medium, a lower cone-shaped hopper discharge portion being provided therein with a whirlpool means and material handling discharge means, said whirlpool means having trans-radial and trans-peripheral passages for directing the pneumatic medium tangentially into a whirlpool pattern and said conduit means having a tangential connection with said trans-radial and trans-peripheral passages, a venturi within said lower portion below the whirlpool means and communicating with said discharge means, said conduit means communicating with the whirlpool means and the venturi means whereby material placed within said lower hopper portion is swirled by said whirlpool means and sent out said venturi into said material handling discharge means.

9. A hopper construction for breaking up of bulk material within hopper attendant to delivery to a hopper discharge comprising means creating a vortex-whirlpool pressurized path within the lower portion of the hopper for diverting material in a swirling path out of said hopper discharge, said means comprising annular means disposed within the lower portion of the hopper and defining a gradually diminishing annular path within the lower hopper portion and a central whirlpool zone and provided within tangential directing pneumatic conducting means generating a vortex for the breaking up of bulk material within the hopper, and said annular means comprising a plurality of trans-radial and trans-peripheral passages tangentially communicating with said diminishing annular path and said whirlpool zone for diverting of the pressurized pneumatic medium in a tangential path defining an outer rim of high pressure and a central eye of reduced pressure to swirl the material in a cyclonic-like path for discharging the same outwardly of the hopper.

10. The invention according to claim 9 and venturi means disposed within said vortex path beneath said annular means for withdrawing by said pneumatic conducting means of material that is subjected to said whirlpool pattern.

11. A hopper construction for breaking up of bulk material within the hopper attendant to delivery to a hopper discharge comprising means creating a vortex-whirlpool pressurized path within the lower portion of the hopper for diverting material in a swirling path out of said hopper discharge, said means comprising annular means disposed within the lower portion of the hopper and defining a gradually diminishing annular path within the lower hopper portion and a central whirlpool zone and provided with tangential directing pneumatic conducting means generating a vortex for the breaking up of bulk material within the hopper, and said annular means comprising a plurality of passageways communicating with said diminishing annular passage and said whirlpool zone for diverting of the pressurized pneumatic medium upwardly and downwardly directing tangential path defining an outer rim of high pressure and a central eye of reduced pressure to swirl the material in a cyclonic path outwardly of the hopper.

References Cited by the Examiner
UNITED STATES PATENTS

| | | | |
|---|---|---|---|
| 1,566,517 | 12/1925 | Bergman | 302—53 |
| 2,498,143 | 2/1950 | Struckmann | 302—29 |
| 2,794,686 | 6/1957 | Anselman et al. | 302—53 |
| 3,034,835 | 5/1962 | Kauffman et al. | 302—53 |
| 3,210,131 | 10/1965 | Booth et al. | 302—53 |

ANDRES H. NIELSEN, *Primary Examiner.*